United States Patent

[11] 3,545,466

| [72] | Inventor | Romald E. Bowles |
| | | Silver Spring, Maryland |
| [21] | Appl. No. | 435,167 |
| [22] | Filed | Feb. 25, 1965 |
| [45] | Patented | Dec. 8, 1970 |
| [73] | Assignee | Bowles Engineering Corporation |
| | | Silver Spring, Maryland |
| | | a corporation of Maryland |

[54] FLUID OPERATED VALVE
15 Claims, 8 Drawing Figs.

[52] U.S. Cl. .................................................. 137/81.5
[51] Int. Cl. .................................................. F15c 1/14
[50] Field of Search .................................... 137/81.5; 60/231

[56] References Cited
UNITED STATES PATENTS

| 3,276,473 | 10/1966 | Lewis et al. | 137/81.5X |
| 3,375,841 | 4/1968 | Schonfeld et al. | 137/81.5 |
| 3,039,490 | 6/1962 | Carlson | 137/81.5 |
| 3,102,389 | 9/1963 | Pederson | 137/81.5 |
| 3,143,856 | 8/1964 | Housmann | 137/81.5 |
| 3,177,888 | 4/1965 | Moore | 137/81.5 |
| 3,206,928 | 9/1965 | Moore | 60/231 |
| 3,208,462 | 9/1965 | Fox | 137/81.5 |
| 3,213,682 | 10/1965 | Gongwer | 137/81.5 |

Primary Examiner—M. Carey Nelson
Assistant Examiner—William R. Cline
Attorney—Hurvitz and Rose ABSTRACT: There is disclosed a three-dimensional fluidic valve of the boundary layer type having a diverging-converging reversing chamber downstream of the control fluid interaction region. The chamber terminates downstream in a narrow throat which is substantially filled by the power stream of the device so that the boundary layer and static pressures of the device are isolated from pressures downstream of the throat.

PATENTED DEC 8 1970
3,545,466
SHEET 1 OF 2
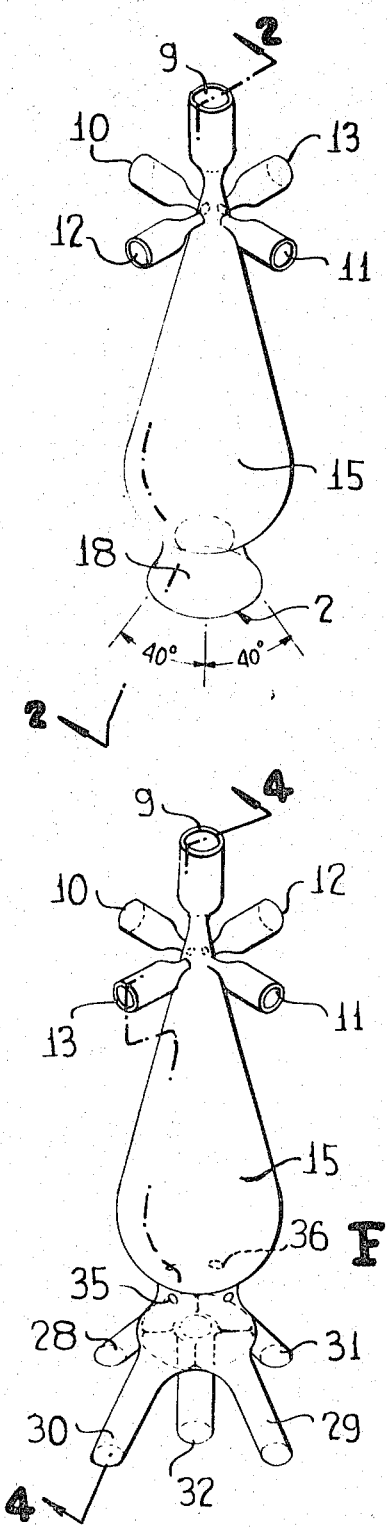
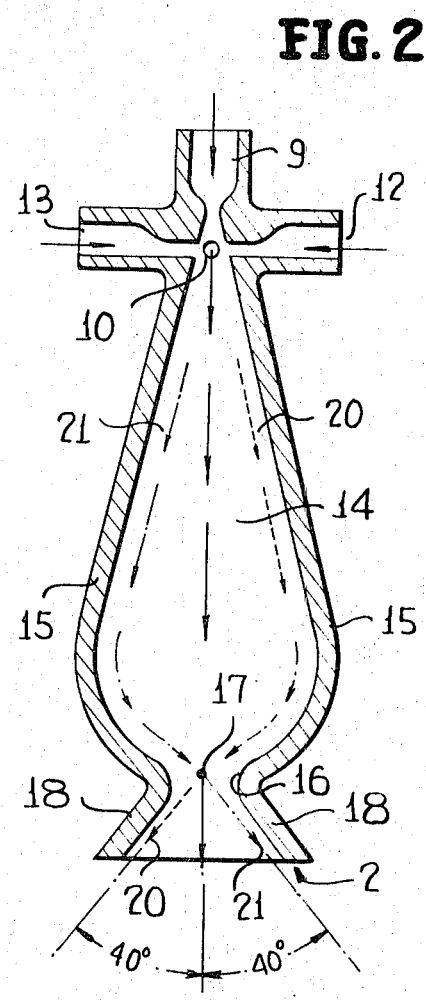
INVENTOR
ROMALD E. BOWLES
BY Hurvitz + Rose
ATTORNEYS

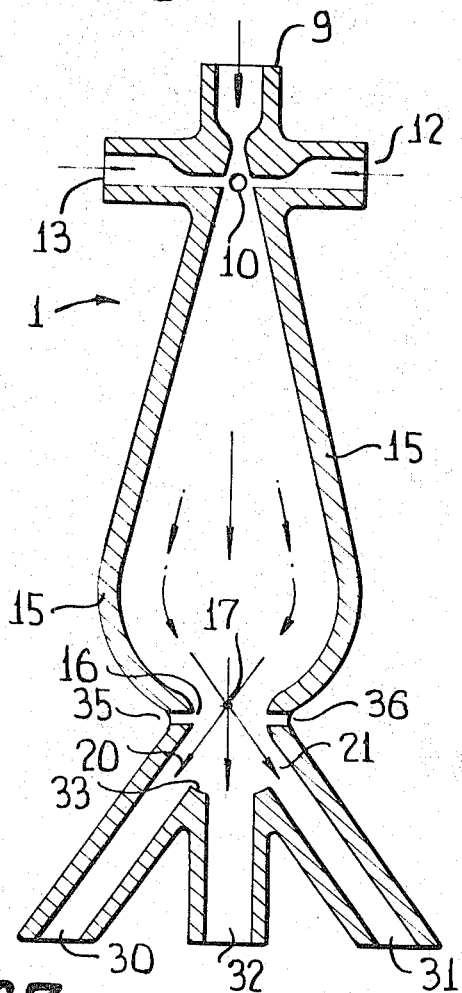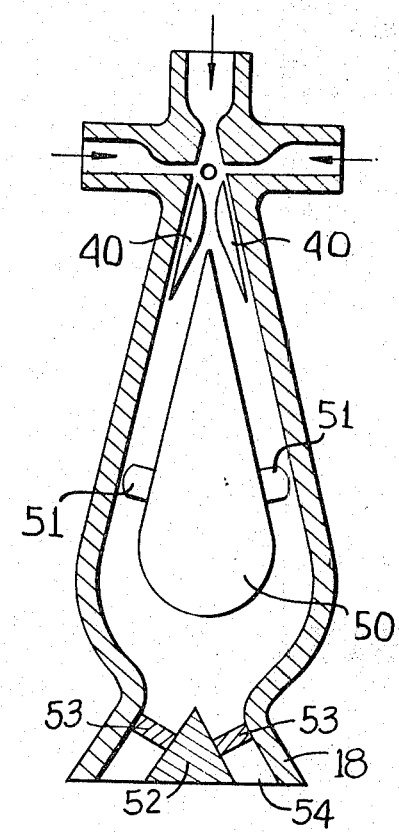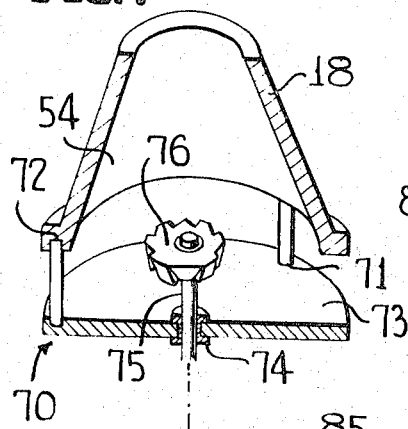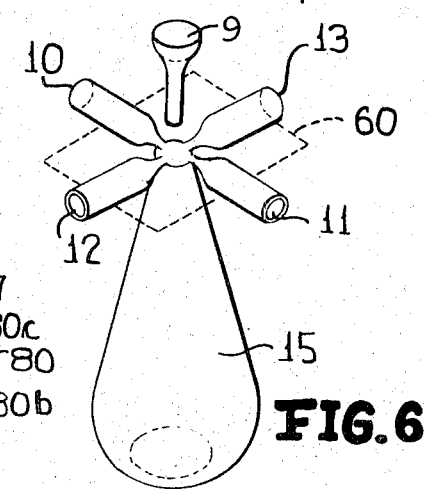

FLUID OPERATED VALVE

The present invention relates to pure fluid elements and, more particularly, to a fluid amplifier or valve of the no-moving-parts type that can be utilized for various control purposes in rockets and the like.

Broadly, a rocket generates forward thrust by the ejection of hot gases through an expansion nozzle, which is directed in the opposite direction. It is already known that a part of these gases can be channeled from the combustion chamber and then fed back into the expansion nozzle for what has become known in the art as thrust vector control. The "heart" of a thrust vector control system is a fluid valve that controls the direction of the steering stream of fluid as it is secondarily ejected to provide the desired steering thrust.

Because of the high temperatures and pressures and the highly corrosive nature of the gases, mechanical valves with moving parts have proven to be not completely satisfactory in such an environment due to short life and jamming due to deposition of solid particles or solidification of liquid droplets at critical locations. It has been proposed to use fluid amplifiers as the control valve in such systems since there are no moving parts to be adversely affected by the aforementioned conditions. However, a serious limitation is encountered in the use of pure fluid elements, particularly of the boundary layer type, in that they are sensitive to the low atmospheric pressures which are present at high altitudes. This sensitivity is a result of the amplifier being designed for particular boundary layer pressures on opposite sides of the power stream in the interaction region where the critical deflection of said power stream by the control streams takes place. If this pressure ratio is upset by evacuation of one of the boundary layer regions through an inactive passage, spurious and false output signals are produced by uncontrolled deflection of the power stream.

It has recently been suggested to employ a two-dimensional fluid valve of the bistable type and cross the outlet of the inactive passage with the fluid stream of the active passage thereby effecting steering control and at the same time blocking the outlet of the inactive passage. This blocking tends to isolate the interaction region from the output load conditions and permits operation of the valve in low atmospheric pressure regions. This valve, however, has its limitations in that thrust vectors can be generated in only one plane since it is essentially a two-dimensional device. Further, since it is digital in nature, it is limited to an on-off type of operation.

According to the present invention, I am able to direct flow to three or more azimuths of secondary injection in either digital or analogue fashion for steering control. In addition, a neutral position supplying an axial thrust jet is provided. In a preferred embodiment, four control ports or nozzles eject streams that interact with the boundary layer of the steering flow manner to deflect said steering flow in the desired direction. Thus with a single valve, I am able to control steering in both pitch and yaw while still providing for an axial thrust in a neutral position; whereas, previous devices have been limited to one of these steering functions.

The three-dimensional valve of the present invention is characterized by a single outlet for the steering stream that is filled with exiting gases at all times whereby the interaction region is isolated from outlet load conditions. In addition, the valve constructed in accordance with my invention is not limited in its operation to thrust corrections in a single plane or to flip-flop type functions but can generate three-dimensional proportional or digital outputs in any direction or plane for greater fidelity of steering control.

Thus, an important feature of my invention is the three-dimensional configuration of a pure fluid valve incorporating the requirements for thrust vector control applications. This is made possible through the use of a generally tear-shaped surface of revolution as a novel interaction chamber that terminates in a single restricted orifice where output signal crossover occurs. The high energy steering stream, which is preferably at near sonic velocity for compressible fluids, substantially completely fills the orifice thereby isolating the interaction region of the element from outlet load conditions.

In conjunction with this steering valve, I have discovered that it is possible to use annular receiving ducts downstream of the reversing chamber to further distribute the steering stream. Heretofore, amplifier elements of the type just described were not practical since in prior devices the signal crossover location was variable causing the output signal to be erratic and unpredictable in the presence of unknown loading conditions. It has been found that through the use of my novel tear-shaped reversing chamber with its generally concave walls, output flow crossover always occurs substantially centrally of the output orifice, thereby causing the element to produce amplified pressure or other parameter signals in the receiving ducts.

Accordingly, another important feature of the present invention is the provision of an amplifier element that incorporates the principles of the crossover valve or amplifier of the present invention. It will be seen that since this new type of element accurately reverses the output signal so that that it appears on the same side of the amplifier as the dominating control signal, this device is highly useful in other pure fluid systems where a reversed output signal is desired to simplify the interconnection of elements, for example.

Broadly, it is an object of this invention to provide a three-dimensional fluid valve suitable for use in a thrust vector control system.

Another object of this invention is to provide a fluid valve with a single restricted outlet that is adapted to eject fluid in an unlimited number of directions to effect digital or proportional thrust vector control of a rocket or the like.

It is an object of this invention to provide a three-dimensional fluid valve with no moving parts that is not sensitive to outlet load conditions.

It is another and related object of this invention to provide a pure fluid amplifier element that is not sensitive to outlet load conditions.

Still another object of this invention is to provide a pure fluid amplifier element that has reversed output signals through signal crossover.

It is still another object of this invention to provide a pure fluid amplifier of the passive crossover type wherein crossover occurs at a fixed point thereby making said amplifier useful for digital or analogue functions.

It is another object of this invention to provide a multiple outlet logic system of the pure fluid type that acts in response to multiple fluid input signals.

It is still another object of this invention to provide a three-dimensional fluid valve having a servoreadout means at the output signal location operable in response to the output jet of said valve.

The above and still further objects, features and advantages of the present invention will become apparent upon consideration of the following detailed description of one specific embodiment thereof, especially when taken in conjunction with the accompanying drawings wherein:

FIG. 1 is an overall perspective view of the steering valve of the present invention showing exhaust nozzle and four control nozzles;

FIG. 2 is a cross-sectional illustration of the valve of FIG. 1;

FIG. 3 is an overall perspective view of the logic element constructed in accordance with the device of FIG. 1;

FIG. 4 is a cross-sectional illustration of the element of FIG. 3;

FIG. 5 is a cross-sectional illustration of the device of the present invention employing means to isolate control signals and facilitate stream lockon for saturated analogue or digital operation;

FIG. 6 is a schematic view of a momentum exchange embodiment of the valve of the present invention;

FIG. 7 is a perspective illustration of the servoreadout unit of the present invention; and FIG. 8 is a top view of the turbine wheel of the readout unit of FIG. 7.

With reference to FIG. 1 of the accompanying drawings, a three-dimensional analogue fluid valve 1 of the boundary layer type is illustrated which has a single exhaust nozzle, generally indicated by the reference numeral 2. A fluid steering stream issues from the exhaust nozzle 2 with a definite directional attitude with respect to the fluid valve 1 and imparts a corresponding thrust vector reaction thereto in accordance with well known principles. As previously indicated, this valve can be utilized as the "heart" of a steering system for rockets and the like. Providing thrust variations in any desired vectored direction within a conical angle of up to approximately ±40° as indicated in the drawing.

The basic configuration of my invention, as illustrated in FIG. 1, is supplied with pressurized fluid, preferably at a level sufficient to provide supersonic flow from power nozzle 9 and preferably four setback control nozzles 10, 11, 12, 13. The particular arrangement illustrated increases the valve's gain and thrust in accordance with the well known theory of convergent-divergent nozzle construction; it being understood, however, that any other suitable power nozzle shape, nozzle orientation, number of control nozzles (as long as there are at least three), and control nozzle location can be used. As the power stream exits from the nozzle 9, its direction is controlled generally by pressure changes in the boundary layer regions according to the relative energy and flow rate of the control streams that issue from the control nozzles 10,11,12.13, as in the conventional pure fluid amplifier of the boundary layer type. After the control signal has been imparted to the power stream it is reversed or reorientated in a novel manner and ejected from the nozzle 2 into the surrounding atmosphere.

FIG. 2 is a cross-sectional view taken through lines 2–2 indicated in FIG. 1 and will now be referred to for ease of discussion. As stated, control streams from the nozzles 12 and 13 contribute to the control of the power stream that issues from the power nozzle 9. The controlled fluid flow then enters a generally tear-shaped reversing chamber 14, which is a very important feature of the present invention and will now be considered. The main function of the chamber 14 is to reorientate the power stream for reasons which will later become apparent. The chamber 14, formed by body of revolution 15, has a gradually diverging surface immediately downstream of the control nozzles 10—13 to receive the power stream, and terminates in a rapidly converging section to redirect the fluid flow back toward the centerline. The reversing chamber 14 terminates in a throat 16, which is so positioned in the symmetrically converging chamber that crossover of the steering stream always occurs centrally of the throat 16 at region 17. The body 15 can be extended downstream of said throat 16 to form an exhaust nozzle for increased exhaust jet stability and in the case of compressible fluids for increased thrust efficiency in accordance with exhaust nozzle principles.

As stated, providing steering stream crossover at the throat 16 produces very desirable advantages in terms of operation of my valve. That is, the steering stream fills the throat 16 with high energy gases or other fluid during operation of the device, thereby effectively sealing the interaction region of the valve 1 from outlet conditions which might modify the desired valve operational characteristics or in extreme cases might render said valve inoperative. This sealing action prevents the reversing chamber 14 from being directly coupled to the lower pressure downstream of the throat 16 thereby maintaining said chamber at an artificially stabilized static pressure dominated by the local static pressure of the power stream in chamber 14 rather than by the static pressures downstream of throat 16.

Referring again to the control operation of the valve 1, fluid flow with an infinitely variable directional attitude can be generated to create an infinitely variable thrust reaction. For example, a full signal at nozzle 13 will cause maximum deflection along the right-hand wall of the chamber 14, as denoted by dashed arrows 20 in FIG. 2. After the flow reaches the crossover point 17, it is exhausted to the surroundings via nozzle 2 and provides a corresponding thrust reaction. Conversely, if a full signal is received at the nozzle 12, fluid flow as illustrated by arrows 21 will be generated, and a corresponding thrust created at an angle of approximately 80° to the thrust created by the opposite full signal just mentioned. As previously indicated, any thrust vector including these two full signals can be created with the appropriate control signal or addition of the control signals in the usual push-pull or vectorial resultant manner. A neutral fluid flow, which can be utilized as axial thrust, is denoted by the solid arrows and is generated when the control signals at the nozzles 10,11,12 and 13 (see FIG. 1) are equal. Referring to the control signals just mentioned, either continuing control streams or pulse-modulated control streams can be utilized. That is, the control streams may be varied over a range, either in continuous or pulse form. Also, complete control of my device for limited purposes can be effected by the use of less than all of the control nozzles, if desired, the remaining control nozzles being used merely as biases. This feature is desirable where a limited number of signals are available from the rocket guidance system and/or when addition of two or more control signals are not necessary.

A modification of the thrust-vector control valve of FIG. 1 produces an amplifier element as illustrated in FIGS. 3 and 4, wherein like reference numerals refer to like elements. In this embodiment, the fluid flow is received downstream of the throat 16 by a series of any number of receiving ducts 28,29,30,31,32 and subsequently exhausted from the ducts for thrust vector control or utilized to produce digital or analogue functions in a pure fluid circuit. In the most usual case, the number of receiving ducts corresponds to the control nozzles but it is to be understood that any number of control nozzles and ducts or combination of these can be used.

As illustrated in FIG. 4, the receiving ducts 28—31 are directed directly toward the discharge end of the concave walls of the tear-shaped chamber 14 to receive the full flow of the power stream in each of its fully deflected positions. Likewise, the receiving duct 32 is directed up the center of the amplifier. The concave walls passively amplify the power stream by deflecting it in accordance with the angle at which it is received after being actively amplified in the interaction region. For example, as indicated in FIG. 4, the flow represented by the arrow 20 is received by duct 30, flow 21 is received by duct 31 and neutral flow up the center of the device is received by duct 32. At any intermediate position, the fluid flow will be appropriately divided between the adjacent ducts. It has been found that the combination of my novel tear-shaped reversing chamber with its concave wall surface and this positioning of the ducts, gives me a high quality of amplified output signal during either analogue or digital operation.

Cusps 33 and 34 can be provided at the leading edges of the dividers to provide positive feedback to stabilize the stream in the fully deflected and neutral positions. This stabilization occurs when a vortex is formed at the cusp 33 or 34 thereby directing flow from the boundary layer regions back against the stream. However, it is to be understood that these cusps are eliminated when proportional operation is desired so that the stream will be split proportionally between the two adjacent receiving ducts, for example, 30, 32 or 31, 32 as illustrated in FIG. 4.

Bleed channels 35 and 36 can be provided in the body 15 at the throat 16 to control or stabilize the static pressure at the crossover region 17. These channels increase the gain of the device in certain cases by freeing the high velocity stream from high static pressure surroundings, thus making the steering stream more flexible and easier to deflect by the control streams.

The crossover location or throat 16 acts as a decoupler between the output load conditions and the control signals, as stated with regard to the device of FIG. 1. With this feature in mind, it is contemplated that the logic element of FIGS. 3 and 4 be utilized to perform either thrust vector control or amplifier functions where undesirable output load conditions are present.

A feature in addition to the decoupling feature makes my device very valuable in certain fluid systems. That is, the amplified signal or positive output is located in the receiving duct on the same side of the center line of the amplifier or valve 1 as the signal input. Note, for example in FIG. 4, that the amplified signal from control nozzle 12 is received by receiving duct 31 which represents a reversal from the usual amplifier. It should be noted that the receiving ducts 30, 31 are directed toward the downstream slope of the concave walls 15 in order to receive the deflected streams after they pass through the crossover region 17. The foregoing feature is very desirable in designing a pure fluid system since it allows the designer to avoid transferring a particular signal from one level of the "Optiform" plate to another level and back again to reverse the physical relationship of that particular signal.

As stated, the device of the present invention is capable of either digital or analogue operation, which is dependent upon the particular design of the element. For example, it has been found that generally if a long reversing chamber is provided, the fluid stream will tend to lock on the body 15 once it has been deflected into the vicinity thereof due to boundary layer effects. Conversely, if the chamber is relatively short, the stream will tend to deflect back to the neutral position once the control signal is released, thus making analogue or proportional operation possible.

In FIG. 5, wall attachment ribs 40 and center divider island 50 with supporting fins 51 can be employed to decouple adjacent control signals as during high-speed phased signal operation. The ribs 40 are positioned to each side of the deflected stream in each of its four steering positions and so are located between boundary layer regions controlled by the separate control flows. The fins 51 are preferably directly downstream of the ribs 40 and supply additional means to keep the deflected stream from creeping around the body 15 due to power stream vorticity. The island 50 provides additional surface on which the stream can "cling" to maintain its deflected position. It is to be understood that other appropriate supplementary guiding means can be employed; for example, as shown in this FIG., a wedge-shaped island 52 and supporting fins 53 can be used in the exhaust nozzle 18 in either the digital or analogue device of the present invention. The island 52 and the wall of nozzle 18 forms an open annulus 54 for exhausting the power stream during operation.

In FIG. 6, there is illustrated another embodiment of the valve of the present invention wherein the interaction region denoted by the dashed outline 60 is open to ambient pressure so that the pressures around the power stream are equal whereby the deflection of the power stream is not affected by boundary layer conditions as in the boundary layer device. In this embodiment, then, the deflection of the power stream is solely a function of momentum exchange between the control streams and the power stream whereby an analogue type of operation is obtainable.

This momentum exchange type of amplifier can be utilized solely for its passive crossover amplification potential as discussed above with regard to the device of the boundary layer type. It will be noted that in this embodiment, the exhaust nozzle 18 has been eliminated; and operation of the device of the present invention without such a nozzle has been found to be essentially as described above with the output jet exiting the throat 16 in the appropriate direction.

In certain cases, it is desirable to employ a fluid-mechanical interface to provide an output indicator for application to a particular mechanical operation to be performed. To this end, there is provided a servoreadout unit 70 disposed at the mouth of the exhaust nozzle 18 of the device of the invention, as illustrated in FIG. 7. The unit 70 includes support legs 71 mounted in apertures 72 of the nozzle 18 for positioning a mounting table 73 in spaced relation to said nozzle 18. A bearing 74 centered on the table 73 supports and a rod 75 along the center line of the device. A self centering turbine wheel 76 for monitoring the output stream or jet is fixed to said rod at the upper end thereof and reads the position of the output jet exiting along the open annulus 54, as viewed in FIG. 7, and now to be explained.

There is formed on the periphery 77 of the turbine wheel 76 a first and second plurality of slots, generally designated by reference numerals 80 and 81 (see FIG. 8). The slots 80, 81 are suitably machined or otherwise formed in the wheel 76 on the slant so as to be adapted to receive the output jet of the valve 1 and cause rotation of said wheel 76 in either a clockwise or counterclockwise direction depending upon which plurality of slots intercepts said output jet of the device. Assume for purposes of explanation of the operation of the turbine wheel 76 that the output jet to be monitored is directed into the paper in FIG. 8 along the right-hand side of the wheel 76 at point A so that one of the slots 80 intercepts said jet. The wheel 76 immediately rotates in the clockwise direction due to the dynamic pressure of the jet acting on exposed surface 80a; then on surface 80b and 80c; and, finally on surface 80d. Similarily, surfaces 81a, 81b, 81c, and 81d of slots 81 are exposed so that counterclockwise rotation is induced by a jet impinging thereon. For example, if the output jet is located at point B, rotation is induced by the jet acting on the surface 81c and then by action on the surface 81d. A through passage 83 is formed between the terminal portion of surfaces 80d and 81d to accommodate the output jet in a self-centering manner; that is, when this portion of the wheel 76 is engaged by the output jet, the equal forces action on the symmetrical surfaces 80d and 81d cancel out leaving said wheel 76 locked on said jet in a desirable manner. The surfaces 80a and 81a may be slightly assymmetrical to prevent lockon at this point. It is to be understood that the wheel 76 can be positioned at other output signal locations where a signal is discernible, that is, at two dimensional signal locations displaced from the crossover region 17 along the central axis of the device.

A utilization device 85 may be connected to the output shaft 75 in a suitable manner (FIG. 7) and thus be responsive to the input control signals present at the control nozzles 10-—13, as is apparent from the above discussion.

I claim:

1. A three-dimensional fluid valve of the boundary layer type comprising a power nozzle adapted to issue a power stream along the centerline of said valve, at least three control means for deflecting said power stream from travel along said centerline a diverging-converging reversing chamber downstream of said control means to receive and deflect said power stream back toward said center line, a single nozzle means forming the terminal portion of said reversing chamber a single nozzle means forming the terminal portion of said reversing chamber and adapted to exhaust said power stream, the throat of said exhaust nozzle being substantially filled by said power stream during operation whereby the boundary layer of said power stream and the static pressure of said chamber upstream of said exhaust nozzle throat is isolated from downstream pressure.

2. The fluid valve of claim 1 wherein said reversing chamber is a body of revolution coaxial with said centerline whereby said power stream can be deflected in an infinitely variable manner.

3. The fluid valve of claim 2, wherein said surface of revolution is substantially tear-shaped.

4. The fluid valve of claim 3, wherein said control means comprise control nozzles adapted to issue a control stream of fluid into the boundary layer of said power stream.

5. The fluid valve of claim 4, wherein is further provided a tear-shaped solid body in said reversing chamber, a wedge-shaped solid body in said exhaust nozzle and supporting fins for centering said solid bodies in said valve to form distinct flow paths for said power stream.

6. The fluid valve of claim 4, wherein said control nozzles are spaced around said valve at different azimuths from a given point.

7. The fluid valve of claim 1, wherein guide means are provided in said chamber to facilitate directional control of said power stream.

8. The fluid valve of claim 1, wherein expansion means is provided downstream of said exhaust nozzle to expand said power stream.

9. In a three-dimensional fluid valve having a power nozzle for issuing a power stream along the centerline of said valve, control nozzles for issuing control streams to deflect said power stream and a receiving chamber defined by a body of revolution positioned on said centerline to receive said power stream, a servoreadout unit comprising an indicator wheel mounted for rotary movement about said center line, a first group of slanted slots formed in the periphery of said wheel along one side thereof, a second group of slots slanted in the opposite direction from said first group formed in the periphery of said wheel along the other side, said first and second groups presenting respectively first and second surfaces causing rotation in opposite senses when impinged by said power stream, a through passage in said wheel at the point along the periphery where the final surface of said groups in the respective direction of rotation of said groups come together whereby said wheel is caused to lock on said power stream due to the equal forces acting on said final surfaces.

10. The combination of claim 9, wherein said receiving chamber comprises a diverging-converging reversing chamber to receive and deflect said power stream toward said center line, a single nozzle means forming the terminal portion of said reversing chamber and adapted to exhaust said power stream, said indicator wheel being positioned at the mouth of said nozzle.

11. In a fluid valve having a power nozzle for issuing a power stream along the centerline of said valve, control means for deflecting said power stream and a receiving chamber defined by a body of revolution positioned on said centerline to receive said power stream, a servoreadout unit comprising an indicator wheel mounted for rotary movement about said center line, a first group of slanted slots formed in the periphery of said wheel along one side thereof, a second group of slots slanted in the opposite direction from said first group formed in the periphery of said wheel along the other side, said first and second groups representing respectively first and second surfaces causing rotation in opposite senses when impinged by said power stream, a through passage in said wheel at the point along the periphery where the final surface of said groups in the respective direction of rotation of said groups come together whereby said wheel is caused to lock on said power stream due to the equal forces acting on said final surfaces.

12. A three-dimensional fluidic valve comprising a diverging-converging chamber having an ingress orifice and an egress orifice, and having an interior axially symmetric wall diverging outwardly from said ingress orifice and converging toward said egress orifice, a power nozzle located upstream of said ingress orifice for issuing a stream of fluid across an unconfined space through said ingress orifice and along the axis of said chamber toward said egress orifice, control means located adjacent said ingress orifice for deflecting said power stream upon entry into said chamber in two coordinate directions perpendicular to said axis.

13. A three-dimensional fluid valve comprising a power nozzle adapted to issue a power stream along the centerline of said valve, at least three control means for deflecting said power stream from travel along said center line, a diverging-converging reversing chamber downstream of said control means to receive and deflect said power stream back toward said center line, a single nozzle means forming the terminal portion of said reversing chamber and adapted to exhaust said power stream, the throat of said exhaust nozzle being substantially filled by said power stream during operation whereby the boundary layer of said power stream and the static pressure of said chamber upstream of said exhaust nozzle throat is isolated from downstream pressure, said power nozzle being spaced upstream from said control means, the region between said power nozzle and said control means being maintained at approximately ambient pressure.

14. A fluid amplifier comprising a power nozzle adapted to issue a power stream along the center line of said amplifier, means for deflecting said power stream to one side or another side of said centerline of said amplifier, redirecting means positioned downstream of said means for deflecting and located on said one and said another side of said centerline to deflect said power stream back toward said centerline whereby the paths of said streams cross one another, said redirecting means terminating in a throat region substantially filled by said stream, at least a pair of receiving passages each alined with and forming a continuation of a different one of said paths, and means for controlling the static pressure in said throat comprising means for venting said throat to a reference pressure.

15. The combination according to claim 14 wherein said means for venting comprises passages extending between an ambient pressure region and said throat.